United States Patent
Toval et al.

(10) Patent No.: US 11,722,389 B2
(45) Date of Patent: Aug. 8, 2023

(54) SYSTEM AND A METHOD FOR IDENTIFYING CLIENT DEVICES USED BY THE SAME USER

(71) Applicant: BI SCIENCE (2009) LTD, Tel-Aviv (IL)

(72) Inventors: Assaf Toval, Herzeliya (IL); Kfir Moyal, Tel-Aviv (IL)

(73) Assignee: BI SCIENCE (2009) LTD, Tel-Aviv (IL)

( * ) Notice: Subject to any disclaimer, the term of this patent is extended or adjusted under 35 U.S.C. 154(b) by 0 days.

(21) Appl. No.: 17/674,828

(22) Filed: Feb. 17, 2022

(65) Prior Publication Data

US 2022/0385551 A1    Dec. 1, 2022

Related U.S. Application Data

(60) Provisional application No. 63/195,014, filed on May 30, 2021.

(51) Int. Cl.
| | | |
|---|---|---|
| *H04L 43/065* | (2022.01) | |
| *H04L 67/02* | (2022.01) | |
| *H04L 43/04* | (2022.01) | |
| *H04L 67/50* | (2022.01) | |
| *G06Q 30/0251* | (2023.01) | |

(52) U.S. Cl.
CPC ....... *H04L 43/065* (2013.01); *G06Q 30/0269* (2013.01); *H04L 43/04* (2013.01); *H04L 67/02* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 8,458,195 B1 * | 6/2013 | Procopio | G06F 16/9535 |
| | | | 707/749 |
| 9,129,032 B2 * | 9/2015 | Cancel | G06F 16/958 |
| 9,292,793 B1 * | 3/2016 | Lin | G06F 21/44 |
| 9,460,390 B1 * | 10/2016 | Lin | G06N 7/01 |
| 9,514,248 B1 * | 12/2016 | Guan | H04L 9/40 |
| 10,034,135 B1 * | 7/2018 | Provost | H04W 12/033 |
| 10,348,567 B2 * | 7/2019 | Zhou | H04L 67/52 |
| 10,805,163 B2 * | 10/2020 | Tandel | H04L 67/303 |

(Continued)

*Primary Examiner* — Lashonda Jacobs-Burton
(74) *Attorney, Agent, or Firm* — Smith Tempel Blaha, LLC; Gregory Scott Smith

(57) ABSTRACT

A method for associating a device with a user including the action of receiving from a first computerized device operated by a first user a first data content including a plurality of first data items, including clickstream data. An action of setting rules for computing scores representing similarity between a first data item received from the first computerized device and a second data item received from a second computerized device. An action of collecting the plurality of the first data items and the second data items, from the plurality of computerized devices of the plurality of computerized devices. An action of computing the score representing similarity between at least one pair of computerized devices respectively providing the first and the second data items. And an action of determining that the pair of computerized devices are operated by a same user if the score reaches a predetermined value.

8 Claims, 6 Drawing Sheets

(56) References Cited

U.S. PATENT DOCUMENTS

| | | | |
|---|---|---|---|
| 2008/0189254 A1* | 8/2008 | Cancel | G06Q 30/02 |
| 2013/0054575 A1* | 2/2013 | Bodin | G06F 16/9577 |
| | | | 707/769 |
| 2014/0122697 A1* | 5/2014 | Liu | G06F 16/9535 |
| | | | 709/224 |
| 2014/0278746 A1* | 9/2014 | Kolowich | G06Q 30/0201 |
| | | | 705/7.29 |
| 2015/0193638 A1* | 7/2015 | Cook | G06F 16/245 |
| | | | 726/27 |
| 2016/0182657 A1* | 6/2016 | Mukherjee | H04L 67/535 |
| | | | 709/223 |
| 2018/0324265 A1* | 11/2018 | Macskassy | H04L 65/40 |
| 2019/0197072 A1* | 6/2019 | Raman | G06F 16/285 |
| 2021/0012378 A1* | 1/2021 | Demsey | H04L 67/04 |
| 2021/0165783 A1* | 6/2021 | Deshpande | G06F 16/24568 |
| 2022/0107964 A1* | 4/2022 | Chandrasekar | G06F 40/186 |
| 2022/0156792 A1* | 5/2022 | Campbell | G06Q 30/0255 |
| | | | 705/14.4 |
| 2022/0159077 A1* | 5/2022 | Shrivastava | H04Q 9/00 |
| 2022/0230202 A1* | 7/2022 | Miller | G06Q 30/0255 |

* cited by examiner

SYSTEM AND A METHOD FOR IDENTIFYING CLIENT DEVICES USED BY THE SAME USER

FIELD

The method and apparatus disclosed herein are related to surveying user interaction with computer generated content, and, more particularly but not exclusively, to identifying different client devices used by the same user.

BACKGROUND

Much research is done to analyze the experience a user may have when surfing the world wide web. The raw data for the research may be known as clickstream data or clickpath data. Various software program such as browsers, as well as websites, may collect clickstream data. In this respect, clickstream data may include all the data that is provided to a user of a computerized device via any of the outputs of the device, as well as all the data that is provided by the user of a computerized device via any of the inputs of the device. Such data may be alphabetic, numeric, alphanumeric, graphical, image, etc.

All such clickstream data may be divided into public information and private user information (also known as personally identifying information). Such private user information may be initiated and entered by the user, or initiated and presented to the user by the website. In this respect, private user information may be associated with the user whose web activity is monitored, or can be associated with other users. All such private user information should be removed from the collected (clickstream) data. Therefore, it is difficult to follow the clickpath data, and particularly the public information contained in the clickpath data, for a user using more than two client devices or more.

There is thus a widely recognized need for, and it would be highly advantageous to have, a method and a system for identifying different client devices that are used by the same user, based on the collected public clickstream data, and without relying on private user information.

SUMMARY

According to one exemplary embodiment there is provided a method, and/or a computer program, and/or a computerized system executing the method, and/or the computer program, for associating a device with a user, the method including the following actions:

(a) An action of receiving, by a computerized server, from a first computerized device operated by a first user, a first data content including a plurality of first data items. The first computerized device may be one of a plurality of computerized devices operated by a plurality of users. Each computerized device of the plurality of computerized devices may be communicatively coupled via a communication network to at least one content server of a plurality of content servers. The data content may include at least part of data communicated between any computerized device of the plurality of computerized devices and any content server of the plurality of content servers.

(b) An action of setting at least one rule for computing a score representing similarity between the first data items received from the first computerized device and at least one second data item included in a second data content received from a second computerized device.

(c) An action of collecting the first data content and the second data content respectively including the plurality of the first data items and the second data items, from a plurality of computerized devices of the plurality of computerized devices.

(d) An action of computing the score representing similarity between at least one pair of computerized devices respectively providing the first data and the second data items.

(e) An action of determining that the pair of computerized devices are operated by a same user if the score reaches a predetermined value.

According to another exemplary embodiment, the score representing at least one of a data type of a group of data types may include the same geolocation parameters including at least one data type, and/or the same networking parameters including at least one data type, and/or the same Hypertext Transfer protocol (HTTP) addressing parameters including at least one data type.

According to still another exemplary embodiment, the score may represent occurrence of a particular value of a particular data type of the group of data types within the first data items collected from the first computerized device and within the second data items collected from the second computerized device.

According to yet another exemplary embodiment, the score may represent a first occurrence of a particular value of a particular data type of the group of data types within the first data item collected from the first computerized device and a second occurrence of the particular value within the second data item collected from the second computerized device, where the first occurrence and the second occurrence occurring within a predetermined time period.

Further, according to another exemplary embodiment, the score may represent a ratio between number of occurrences of a particular value of a particular data type of the group of data types and number of occurrences of all values of the same particular data type within a predetermined time period, and where the ratio is computed for the first data items collected from the first computerized device and the second data items collected from the second computerized device, and where both the ratio computed for the first computerized device and the ratio computed for the second computerized device reach a predetermined ratio threshold value.

Further, according to still another exemplary embodiment, the score of at least two different data types may have different score values.

Further, according to yet another exemplary embodiment, the same geolocation parameters may include values representing the same country, and/or the same state, and/or the same city, and/or the same zip code, and/or a similar GPS data.

Additionally, according to another exemplary embodiment, the same networking parameters may include one or more values representing at least one of: the same device internet protocol (IP) address, and/or the same Wi-Fi network name, and/or the same Wi-Fi network address, and/or the same device media access control (MAC) parameters.

Further, according to still another exemplary embodiment, the same Hypertext Transfer protocol (HTTP) addressing parameters may include at least one of: the same WWW domain name, and/or the same full URL path, and/or the same UUID in respective URL paths.

Further, according to yet another exemplary embodiment, the action of computing a total score may combine scores computed for different data types.

Additionally, according to yet another exemplary embodiment a pair of computerized client devices may be determined to be operated by the same user if the total score reaches a predetermined threshold value.

Moreover, according to yet another exemplary embodiment, the pair of computerized devices may be determined to be operated by the same user if the total score reaches a predetermined value within a predetermined time period.

Still, according to yet another exemplary embodiment, computing the probability value that the pair of computerized devices is operated by the same user may be based on at least two of: the total score, the predetermined threshold value, the predetermined time period, number of the different data types combined in the total score, the ratio between number of occurrences, the predetermined time period for calculating the ratio, and the predetermined ratio threshold value.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

Implementation of the method and system of embodiments disclosed blow involves performing or completing certain selected tasks or steps manually, automatically, or any combination thereof. Moreover, according to actual instrumentation and equipment of preferred embodiments of the method and system presented herein several selected steps could be implemented by hardware or by software on any operating system of any firmware or any combination thereof. For example, as hardware, selected steps could be implemented as a chip or a circuit. As software, selected steps could be implemented as a plurality of software instructions being executed by a computer using any suitable operating system. In any case, selected steps of the method and system disclosed herein could be described as being performed by a data processor, such as a computing platform for executing a plurality of instructions.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings.

DESCRIPTION OF EMBODIMENTS

Figure 1:
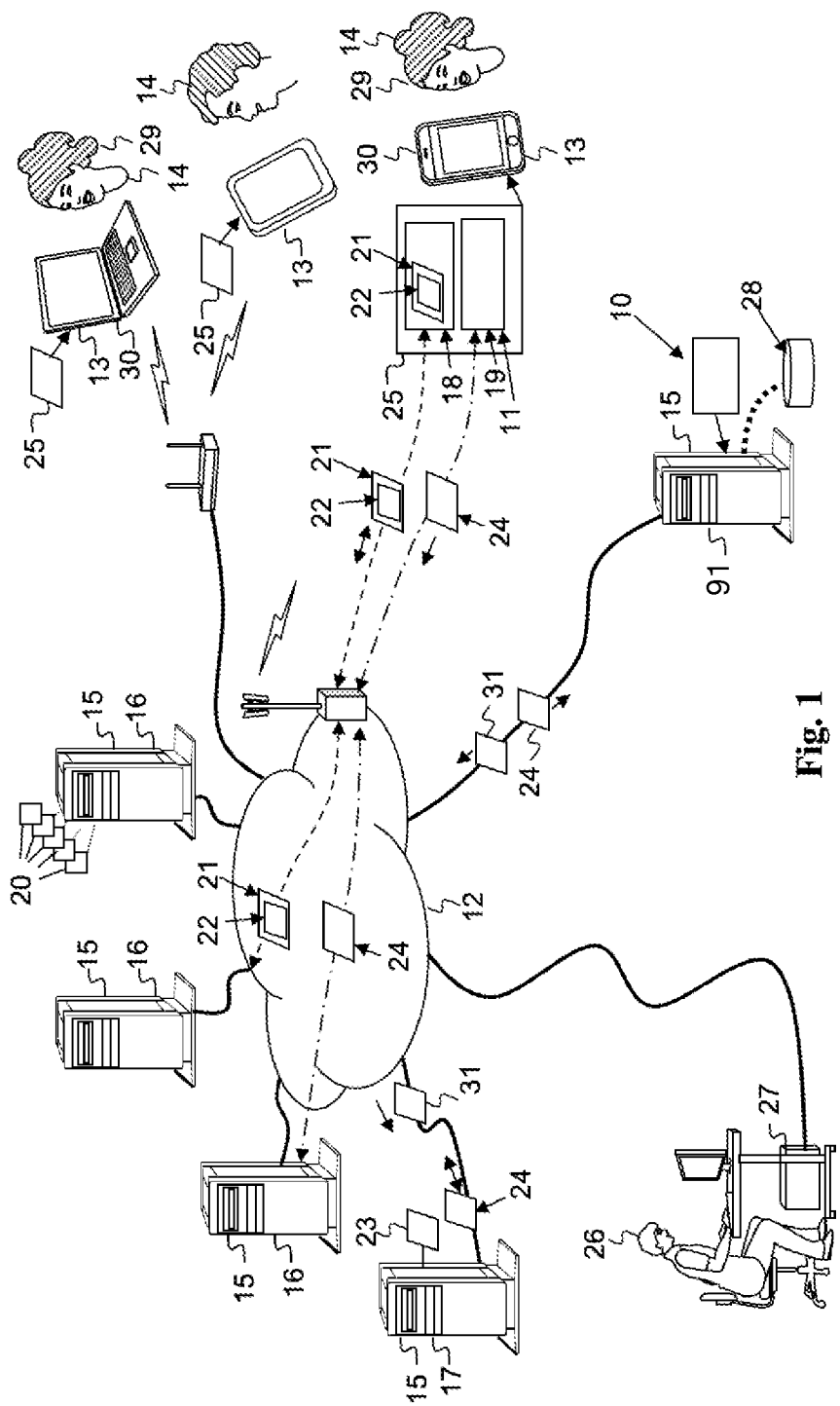
FIG. 1 is a simplified illustration of a device association system executed by at least one association server, communicatively coupled to a communication network, and, via the communication network, communicatively coupled to a plurality of client devices.

The principles and operation of a method and a system for identifying different client devices used by the same user according to some embodiments may be better understood with reference to the drawings and accompanying description.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different drawings may use different scales and different scales can be used even within the same drawing, for example different scales for different views of the same object or different scales for the two adjacent objects.

The terms 'a' or "an", as used herein, are defined as one or more than one. The term plurality, as used herein, is defined as two or more than two. The term another, as used herein, is defined as at least a second or more. The terms including and/or having, as used herein, are defined as comprising. The term coupled, as used herein, is defined as connected, although not necessarily directly, and not necessarily mechanically.

The present embodiments comprise a method and a system for identifying different client devices used by the same user.

In this document the term 'computing device' may refer to any type of computing machine, including but not limited to, a computer, a portable computer, a laptop computer, a tablet computer, a mobile communication device, a network server, a cloud computer, etc., as well as any combination thereof. Such computing device or computing machine may include any type or combination of devices, including, but not limited to, a processing device, a memory device, a storage device, and/or a communication device.

The term 'client computing device', or 'client device' may refer to any type of computing device that is directly used by a user, or that includes a user interface that may be used by a user directly, including means for user input and/or user output. Means for user input may include a keyboard, a pointing device such as a mouse, a microphone, a camera, a touch-sensitive plate or display, means for user gesture control, means for haptic user control, etc. Means for user output may include a display, and/or any other means for providing visual information, a speaker, or an earphone, and/or any other means for providing audible information, means for providing tactile and/or haptic information, etc. The term 'client computing device', or 'client device' may refer to, for example, a desktop computer, a portable computer, a laptop computer, a tablet computer, a mobile communication device, etc. The term 'mobile communication device" may refer to devices such as a tablet, a mobile telephone, a smartphone, etc.

The terms 'user device' or 'client device' may refer to a 'computing device' operated by a user and communicatively coupled to another computing device such as a network server via a communication network. The term 'network server' or 'server' may refer to any type of 'computing device' that is communicatively coupled to a communication network and may include a cloud computer, etc.

The term 'communication network' or 'network' may refer to any type or technology for digital communication including, but not limited to, the Internet, WAN, LAN, MAN, PSDN, etc. Of the abovementioned technology may be wired or wireless, for example, Wireless WAN such as WiMAX, WLAN (Wi-Fi), WPAN (Bluetooth), etc. Wireless networking technology may also include PLMN, and/or any type of cellular network. The term 'communication network' or 'network' may refer to any combination of communication technologies, and to any combination of physical networks. The term 'communication network' or 'network' may refer to any number of interconnected communication networks that may be operated by one or many network operators.

The term 'application' may refer to a software program running on, or executed by, one or more processors of a computing devices, and particularly by a mobile computing device such as a mobile telephone, a tablet, a smartphone, etc., as well as any other mobile or portable computing facility. The term 'mobile application' may refer to an application executed by a mobile computing device.

The terms 'clickstream', 'clickpath', 'clickstream data', 'clickpath data', may include all the data that is provided to a user of a computerized device via any of the outputs of the device, as well as all the data that is collected from the user of a computerized device via any of the inputs of the device. Clickstream data may include private user information. Clickstream data may include advertising as well as information, data, and/or computer code pertaining to advertising.

The term 'private user information' may refer to any information, and/or data, and/or content, that is legally deemed as private to any particular user, or a private property of any particular user, or personally identifying any particular user (personally identifying information). Particularly, private user information is expected to be removed, in the client device, from clickstream data communicated elsewhere, such as to any network server. The term 'public information' may refer to clickstream data not including private user information.

The terms 'visual', 'visual object', 'graphical object', and 'mage' may refer to any type of data provided to the user of the client device or provided by the user of the client device. Such visual data may include text, symbols of any kind and shape, as well as images, such as pictures, video streams, etc.

The terms 'type', 'class' and 'characteristic' may refer to any kind of parameter, or a parameter value, or a range of values of a particular parameter, that may be common to a plurality of data items, or data records, or 'graphical objects', or images, etc.

The term 'advertising' or 'advertisement' may refer to content provided by a third party to a user of an application. An advertisement may be provided to the user in any sensible form such as sound, text, image, video, etc., and combinations thereof. In this sense, for example, the advertisement is provided to the user by the application within the application's screen display, or soundtrack, or any similar medium used by the application. Such advertisement may include private user information.

The term 'advertisement placeholder' (or ad placeholder) may refer to a place within an application, and particularly to an area within a screen display of an application, that may receive an advertisement, or in which an advertisement may be placed. An 'advertisement placeholder' may be associated with, or include, a bidding code. An advertisement placeholder may include code that may communicate with another computerized device, such as a network server, such as an ad server or ad agent. Such communication may include private user information.

The term 'bidding code' may refer to a software program that may be associated, for example, with an advertisement placeholder, and may communicate with an advertisement agent to enable advertisers to bid for the advertising place and communicate an advertisement to be displayed to the user. Such communication associated with the bidding code may include private user information.

A purpose of embodiments described herein may be to enable a server collecting clickstream data from a plurality of client devices to identify and/or to associate two or more client devices that are used, and/or have been used, by the same user. In this respect, A purpose of embodiments described herein may be to enable a server collecting clickstream data from a plurality of client devices to identify a plurality of users, and to associate at least one of the users with two or more client devices that are used, and/or have been used, by this particular user.

Reference is now made to FIG. 1, which is a simplified illustration of a device association system 10 (also designated by numeral 11) executed by at least one association server 91 communicatively coupled to a communication network 12, and, via the communication network 12, communicatively coupled to a plurality of client devices 13, according to one embodiment.

FIG. 1 shows a plurality of first users 14, each using a respective computational device, which is termed here client device 13. Each client device 13 may be communicatively coupled to the communication network 12 via any communication technology, and/or any combination of communication technologies and/or any combination of communication networks.

Each client device 13 may be communicatively coupled via communication network 12 to one or more network servers 15. For example, each client device 13 may be communicatively coupled via communication network 12 to a content providing network server 16 (content server 16), to an association server 91, and to a to a survey server 17. It is appreciated that association server 91 and survey server 17 may be the same server 15.

FIG. 1 shows client device 13, for example, as a mobile telephone or a smartphone, or a tablet computer, or a laptop computer. However, client device 13 may be any type of computer including a desktop computer, etc.

Each client device 13 may execute software programs such as one or more applications 18. Each client device 13 may also execute a client surveying software program 19, which may be part of a surveying system. The term 'execute' may refer to a processor of a computational device (such as client device 13) executing a software program code embodied on a non-transitory computer readable medium.

Any of the applications 18 may include a user interface for interacting with user 14. Such user interface may include various input and output devices for presenting content to user 14, and/or for receiving content from user 14, or under the control of user 14. Such content (e.g., content 20) to be presented to user 14 may be received from one or more content servers 16. Such content received from user 14 may be communicated to one or more content servers 16. Such content communicated between user 14 and one or more content servers 16 may be referred to as clickstream data 21. Such clickstream data may include private user information 22.

Surveying system 91 may include client surveying software program 19 (e.g., client survey software 19) installed in and executed by client device 13 and server surveying software program 23 (e.g., server survey software 23) installed in, and executed by, one or more surveying servers 17. Client survey software 19 may collect clickstream data, in whole or in part, and communicate the collected clickstream data, in whole or in part, to a respective server survey software 23.

It is appreciated that the survey may include a large number of users using various computational devices, operating a large variety of applications, including mobile applications, visiting a large variety of websites, and receiving a large variety of advertisements.

It is appreciated that several surveys may be performed at the same time, or concurrently, by several different survey systems 91. It is appreciated that each surveying server 17, and/or server survey software 23, may communicate with any number of client device 13, and/or client survey software programs 19. It is appreciated that a client device 13, and/or a client survey software 19, may communicate with any number of surveying servers 17, and/or server survey software programs 23. Client survey software 19 may remove private user information 22 from clickstream data 21 thus forming cleaned clickstream data 24 communicated from client survey software 19 to server survey software programs 23 as well as to the device association system 10.

It is appreciated that client devices 13 may each execute a software package 25, which may include various versions of one or more applications 18, one or more client survey software 19 including client privacy software for removing private user information from the clickstream data communicated to the survey servers.

The cleaned clickstream data 24 communicated to the survey servers may be provided to the association system 10 directly from the respective client devices 13, for example, by the client survey software 19, and/or by the surveying server 17, for example, by the server survey software program 23. It is appreciated that such cleaned clickstream data 24 received by the association system 10 and/or the association server 91 may not include private user information.

FIG. 1 also shows a user 26, such as a system administrator, the association system 10, for example, using an administration terminal 27. FIG. 1 also shows a database, or data repository 28, which may be a part of the association system 10.

It is appreciated that client survey software 19 and server survey software programs 23 may be parts of a survey system, and that such survey system is used herein as an example of a system that may collect data, such as clickstream data 21, from a client device 13, and/or an application 18. It is appreciated that clickstream data 21 is used here as an example of any type of data collected by client survey software 19 or a similar software program, and communicated to an external software program represented herein as server survey software programs 23.

It is appreciated that sever software programs such as server survey software 23 and association system 10 may be combined and provided as a single software program.

As shown in FIG. 1, a first plurality of users 14 may be using a second plurality client devices 13 where any user of the first plurality of users 14 may use more than one client device 13. For example, user 14 designated by numeral 29 is using two different client devices 13, both designated by numeral 30. Association system 10 may collect and analyze clean clickstream data 24 to determine associations between users 14 and client devices 13. Association system 10 may then communicate to server survey software programs 23 such associations 31 of particular client devices 13 to their respective users 14.

Figure 2:
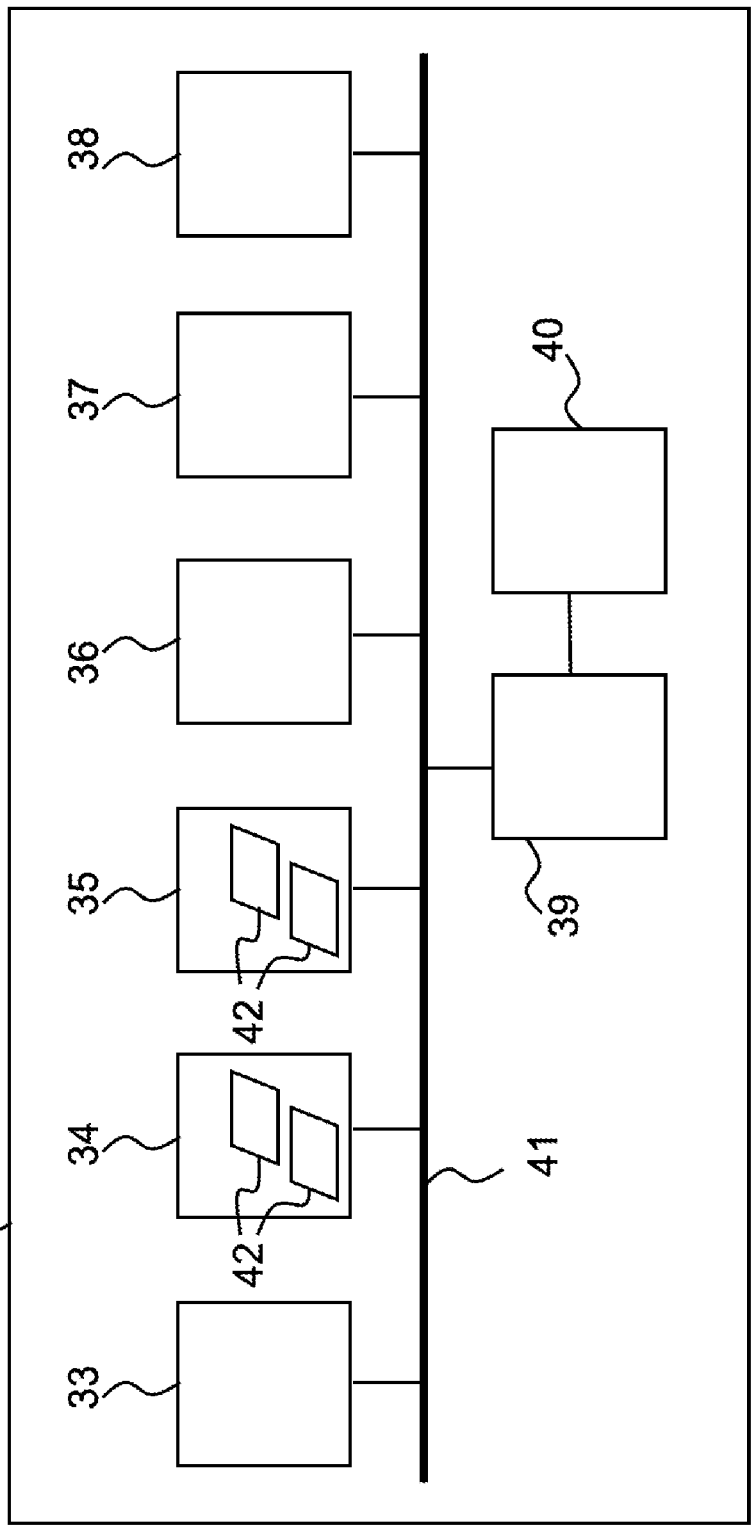
FIG. 2 is a simplified block diagram of a computing device such as the client devices or servers of FIG. 1.

Reference is now made to FIG. 2, which is a simplified block diagram of computing device 32, according to one embodiment.

As an option, the block diagram of computing device 32 of FIG. 2 may be viewed in the context of the details of the previous Figures. Of course, however, the block diagram of computing device 32 of FIG. 2 may be viewed in the context of any desired environment. Further, the aforementioned definitions may equally apply to the description below.

It is appreciated that client device 13, and/or network server 15, may be embodied as one or more computing devices 32 (or computational devices 32). Computing devices 32 can therefore represent a smartphone, a tablet, a laptop computer, a desktop computer, a network server 15, or a part of a network server 15, or a plurality of network servers 15, or a data-center, including cloud-based computing infrastructure.

In this respect, survey system 11 may be embodied using one or more computing devices 32. Computing device 32 may therefore be operative to provide computing infrastructure and resources for any type and/or instance of software component executed within survey system 11. In this regard computing device 32 is operative to process any of the processes described herein. Particularly, computing device 32 one or more non-transitory computer readable media on which software program code may be embodied.

As shown in FIG. 2, computing device 32 may include the following components:

At least one processor unit 33 operative to execute one or more software programs as disclosed with reference to FIG. 1.

One or more memory units 34, e.g. random-access memory (RAM), a non-volatile memory such as a Flash memory, etc., operative to store software programs, parameters, data, databases, digital content, etc.

One or more storage units 35 including, for example, a hard disk drive and/or a removable storage drive, representing a floppy disk drive, a magnetic tape drive, a compact disk drive, Flash drive, etc. The removable storage drive reads from and/or writes to a removable storage unit in a well-known manner. The storage units being operative to store software programs, parameters, data, databases, digital content, etc.

One or more communication units 36 operative to communicatively couple computing device 32 to at least one communication network 12 as disclosed herein and in FIG. 1.

One or more graphic processors 37 and displays 38 operative to enable a user to operate and control computing device 32 and software programs executed by computing device 32.

A power supply 39 and power source 40, such as a battery, for example, if computing device 32 is a mobile, and/or portable, computing device.

One or more communication buses 41 connecting the above units.

One or more computer programs 42, or computer control logic algorithms, which may be stored in any of the memory units 34 and/or storage units 35. Such computer programs, when executed, enable computing device 32 to perform various functions (set forth herein, for example). Memory units 34 and/or storage units 35 and/or any other storage are possible examples of tangible computer-readable media.

It is appreciated that any software program of FIG. 1 may be embodied as a computer program 42 of FIG. 2. For example, applications 18, client surveying software program 19, client privacy software, server survey software 23, association system 10, etc.

Figure 3:
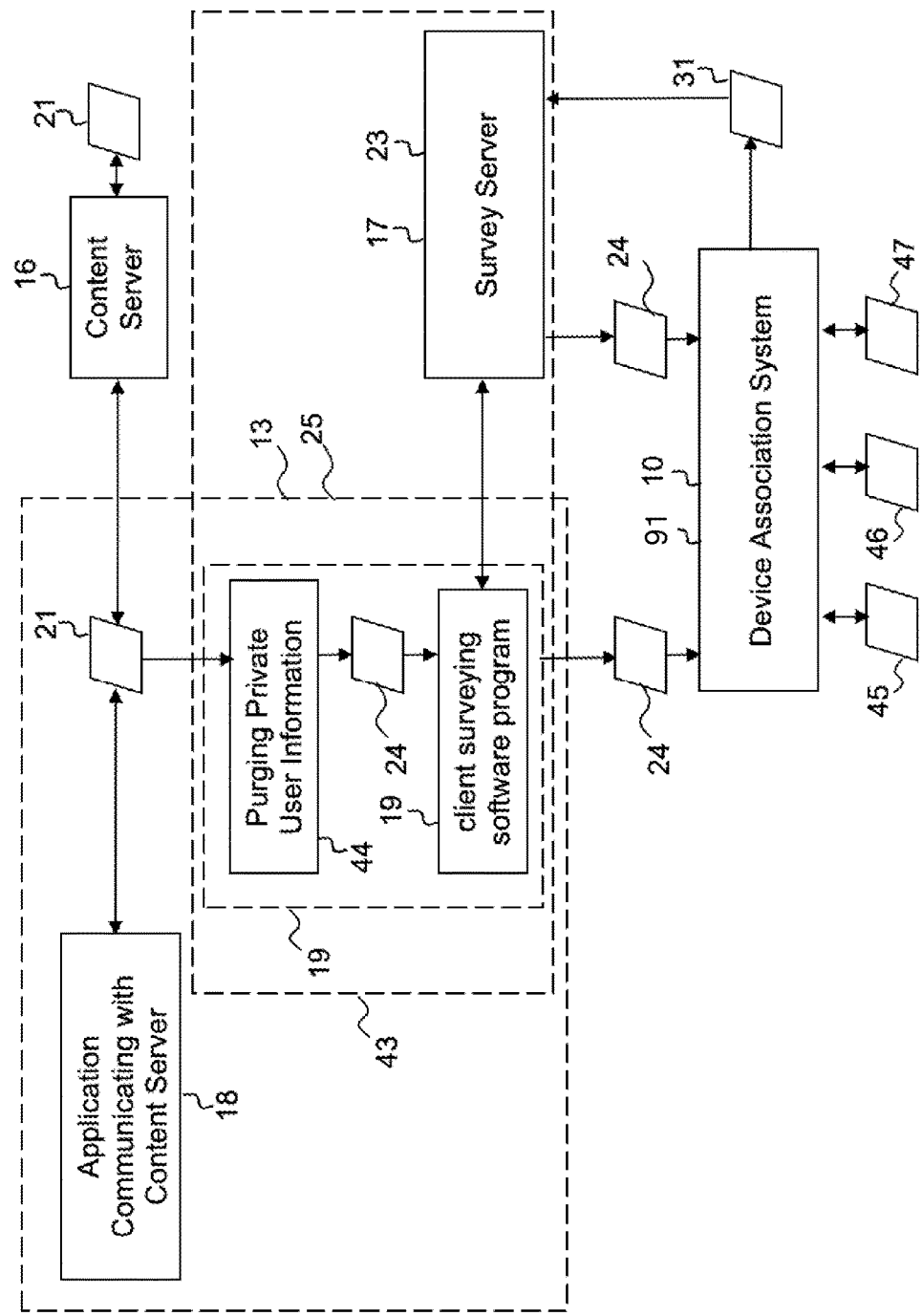
FIG. 3 is a simplified block diagram of association system executed by association server operating with a client device and a survey system.

Reference is now made to FIG. 3, which is a simplified block diagram of association system 10 executed by association server 91 operating with a client device 13 and a survey system 43, according to one exemplary embodiment.

As an option, the block diagram of FIG. 3 may be viewed in the context of the details of the previous Figures. Of course, however, the block diagram of FIG. 3 may be viewed in the context of any desired environment. Further, the aforementioned definitions may equally apply to the description below.

As shown in FIG. 3, application 18 may interact with a content server 16, thus generating clickstream data 21, which may include private user information 22 (not shown in FIG. 3). Client survey software 19 may collect clickstream data 21. Client survey software 19 may be a part of survey system 43, which may include survey software program 23 executed by survey server 17. Client survey software 19 may include a module 44 for removing private user information 22 from clickstream data 21, thus generating cleaned clickstream data 24. It is appreciated that private user information removal module 44 may be part of survey system 43, or may be an independent system serving a plurality of survey systems 43.

Client survey software 19 may then communicate cleaned clickstream data 24 server survey software program 23 executed by to surveying server 17. Client survey software 19 may also communicate cleaned clickstream data 24 to association system 10 executed by association server 91. Alternatively, server survey software program 23 may communicate cleaned clickstream data 24 to association system 10.

Association system 10 may collect into clickstream repository 45 the cleaned clickstream data 24 received from a plurality of client survey software programs 19, and/or received from a plurality of applications 18, and/or received from a plurality of client devices 13, typically operated by a plurality of users 14.

Association system 10 may then analyze the cleaned clickstream data 24 collected in clickstream repository 45 using one or more rules collected in rules database 46. The analysis of the cleaned clickstream data 24 may result in scoring of associations between various clickstream data items, which may be stored in association database 47. Association system 10 may then communicate association updates 31 to a respective server survey software program 23. An association update 31 may include association between any one or more client devices 13 and a respective user 14.

It is appreciated that association system 10 may be part of server survey software program 23, or alternatively, association system 10 may be an independent software system serving a plurality of different server survey software programs 23.

Figure 4:
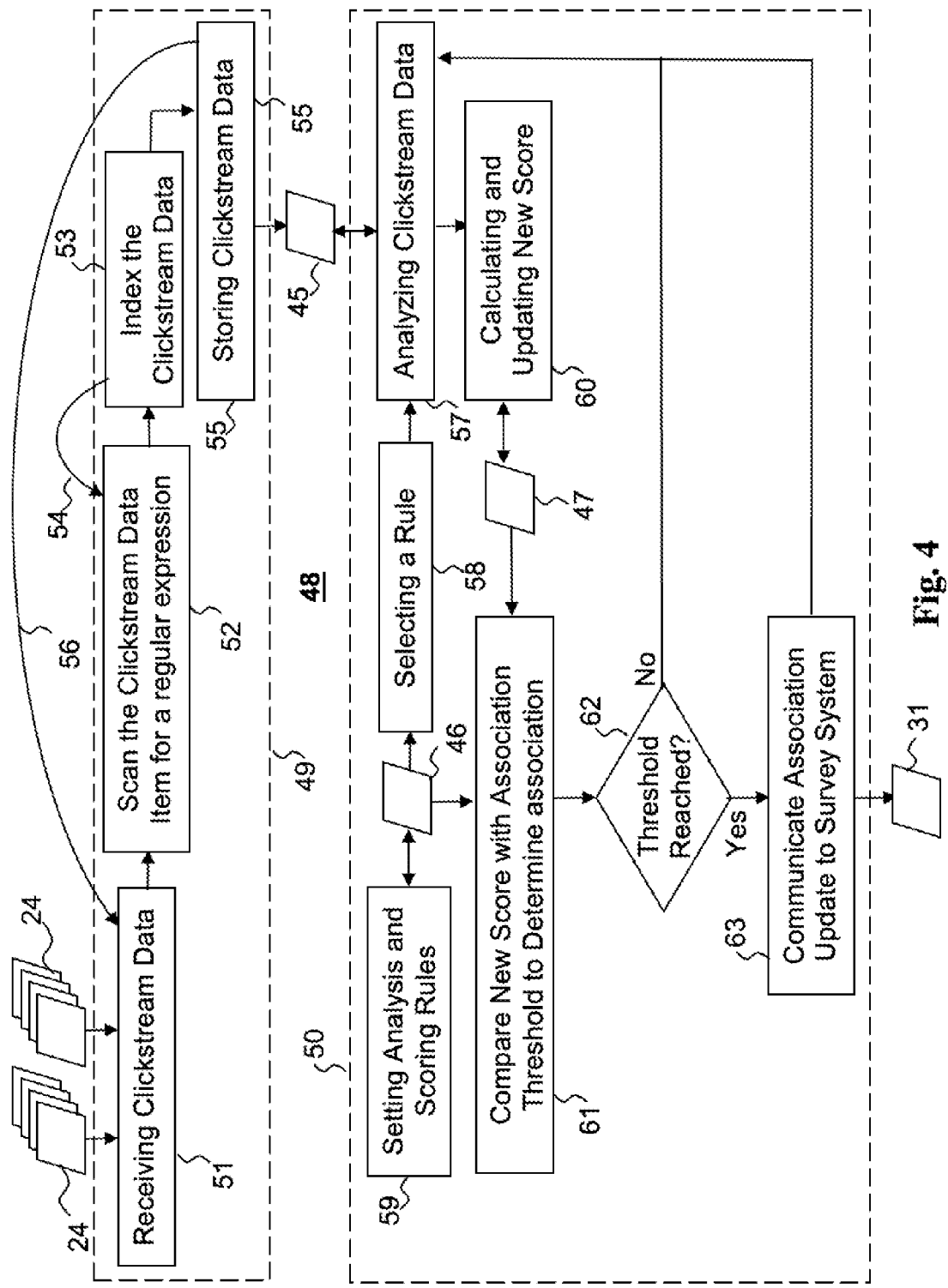
FIG. 4 is a simplified flow chart of association analysis main module of association system.

Reference is now made to FIG. 4, which is a simplified flow chart of association analysis main module 48 of association system 10, according to one exemplary embodiment.

As an option, the flow chart of FIG. 4 may be viewed in the context of the details of the previous Figures. Of course, however, the flow chart of FIG. 4 may be viewed in the context of any desired environment. Further, the aforementioned definitions may equally apply to the description below.

As shown in FIG. 4, association analysis main module 48 may include two processes, a first process 49 and a second process 50, that may be executed in parallel, or in the same time.

The first process 49 of association analysis main module 48 may start with action 51 by receiving clickstream data 24 (e.g., cleaned clickstream data 24, without private user information 22) from a plurality of client device 13, e.g., from a plurality of client surveying software programs 19.

Association analysis main module 48 may then proceed to action 52 to scan clickstream data 24 for any number and types of predetermined information items. Such predetermined information item may include a regular expression and/or a structured expression. Such structure expression may have the form of a typical string of characters, or digits, or alphanumeric characters within a predetermined proximity, and/or limited proximity. A regular expression may have one or more parts that are common or similar and one or more parts that may be particular to the information item. Such common parts may be used to determine a type of the information item. Such particular part may be used to determine similarity between clickstream data 24 received from different client devices 13. Hence, such particular part may be used to determine association between client devices 13 and/or between one or more client devices 13 and a particular user 14.

When an information item is found, the association analysis main module 48 may proceed to action 53 to index the located information item of the clickstream data item 24. The term indexing may refer to a reference and/or a pointer to the particular clickstream data item 24 that may also indicate the type of the information item located within the clickstream data item 24. Additionally and/or optionally, the index may also include an indication of the value, or a part of the particular content carried, or associated with the particular information item.

The index of clickstream repository, or database, 45 may enable random access to each clickstream data item 24 based on an information item type, and/or information item value, that may be located in the particular clickstream data item 24.

Additionally and/or optionally, the term indexing may refer to the processing of code that may add metadata information to each clickstream data item 24. Such metadata may include, for example, external information relating to the clickstream data item 24.

As shown in FIG. 4 by the arrow designated by numeral 54, actions 52 and 53 may repeat to locate in the clickstream data item 24 any number of information items. Such metadata may include a plurality of data fields, or records. Action 53 may maintain an index for each such data field to enable random access to the respective clickstream data item 24. Metadata data fields may describe, for example, the source client device 13, the associated content server 16 and/or content 20, time of user interaction with the respective content server 16 and/or content 20, geolocation parameters of the client device 13, networking parameters of the client device 13, etc.

The association analysis main module 48 may then proceed to action 55 to store clickstream data items 24, as well as the indexing data, and as well as the associated metadata, in a clickstream repository 45, or clickstream repository database 45.

As shown in FIG. 4 by the arrow designated by numeral 56, the first process 49 of association analysis main module 48 may process new clickstream data item 24 continuously, and/or repetitively.

The second process 50 of association analysis main module 48 may start with action 57 by scanning clickstream repository, or database, 45. The second process 50 may scan, retrieve, process and analyze clickstream data items 24 stored in clickstream repository, or database, 45, continuously, and/or repetitively. The second process 50 process clickstream data items 24 while the first process 49 is adding new clickstream data items 24 to the clickstream repository, or database, 45.

Action 57 may retrieve, for example, a newly received clickstream data item 24 from clickstream repository, or database, 45, and then compare this newly received clickstream data item 24 with clickstream data item 24 previously received from other client devices 13. To compare the two (or more) records of clickstream data 24 Process 50 may select (action 58) a rule from rules database 46. In action 59 of process 50, a user, such as administrator 26 (see FIG. 1), may create, set, and/or update, one or more of the rules of rules database 46.

Second process 50 of association analysis main module 48 may then proceed to action 60 to calculate a new score for the association of one or more particular client devices 13 respectively associated with the particular clickstream data item 24 analyzed according to the particular rule. Action 60 then updates the respective one or more association records of the association database 47. Each such association record may indicate a particular association between a particular client device 13 and a particular user 14.

A particular rule may include a function by which an existing score is updated with a new score. For example, the function may include addition, and the newly calculated score is added to the existing score of the association of the particular client devices 13 to the particular user 14. In this regard, an association record may have a value X1, a new score of X2 may be calculated, and the updated value X3 may be X3=X1+X2. However, other functions are contemplated.

For example, the function for calculating a new association score may consider the time lapsing between various updates. For example, the function may decrease the scoring value of older updates considering time lapsed. For example, the function may determine a new score value depending on the type of scores collected so far. For this matter, the association record may include a detailed history of updates.

The second process 50 of association analysis main module 48 may then proceed to action 61 to compare new scores with a respective association threshold value as may be set by the administrator 26 in action 59. Typically, there may be a single association threshold value applicable to all rules of rules database 46. However, in some cases there may be a plurality of association threshold values. For example, for each group of rules. For example, to determine a plurality of levels of association.

If the current (updated) association score value reaches the association threshold value (action 62) then second process 50 of association analysis main module 48 may communicate (action 63) the particular association to the (one or more) surveying server(s) 17.

Rules database 46 may include a plurality of types of rules, or a plurality of groups of rules, where each group includes a plurality of rules of a particular type. For example, the following rule types, or groups are contemplated:

A type, or group, of similarity rules, where each rule may detect a particular similarity between two (or more) clickstream data items 24. Such two (or more) clickstream data items 24 may be received from two (or more) client devices 13.

A type, or group, of scoring rules for evaluating and/or computing a score for a particular type of rule and optionally according to other parameters of the similarity rule such as proximity. For example, time proximity between the two (or more) similar clickstream data items 24. For example, geolocation proximity between the two (or more) similar clickstream data items 24

A type, or group, of summing rules for computing a total score for a particular association between two or more client devices 13, and/or between one or more client device 13 and a particular user 14.

A type, or group, of rules for determining association between two or more client devices 13, and/or between one or more client device 13 and a particular user 14, for example by comparing a total score with one or more association threshold values. Such association determination rule may also include and/or compute a level of determination, such as the probability that one or more client devices 13 are operated by the same particular user 14

A type, or group, of rules for determining the association threshold value for determining association between two or more client devices 13, and/or between one or more client device 13 and a particular user 14. Such threshold computing rule may also include and/or compute a level of determination, or confidence, that the particular client device 13 is properly associated with a particular user 14, and/or with another particular client device 13.

The level of determination, or confidence, may be measured, or computed, in statistical terms, such as probability. The probability may indicate that one or more client devices 13 may be operated by the same particular user 14. Such threshold computing rule may be based on statistical measures, which may be based on the accumulated history of the clickstream data item 24 collected in clickstream repository 45.

Alternatively and/or additionally, such threshold computing rule may be based on statistical measures, which may be based on the accumulated history of the association records collected in association database 47. Such statistical term may indicate the probability that a particular measure, such as computed by the particular rule, may improve with time as more cleaned clickstream data 24 are accumulated.

The term 'proximity' may refer to the distance, temporal and/or spatial, between two or more clickstream data items 24, or particular parts of the two or more clickstream data items 24. The term 'proximity' may also refer to networking data or other data related to the communication technology that may associated two or more client devices 13. For example, network proximity may refer to similarity of Internet protocol (IP) addresses, same Wi-Fi network name, same Wi-Fi network address, same device media access control (MAC) parameters, etc. In this regard, network proximity may form a type, or group of rules for determining association between client devices 13, or between a client device 13 and a user 14.

Temporal proximity, or temporal distance, may be computed, for example, in terms of time, such as the number of seconds that have passed between two or more particular clickstream data items 24. Such two or more particular clickstream data items 24 may be, for example, similar, or otherwise related, according to a particular rule. In this regard, temporal proximity may form a type, or group of rules for determining association between client devices 13, or between a client device 13 and a user 14.

Spatial proximity may refer to a location, or physical distance, between two or more particular clickstream data items 24. Spatial proximity may refer, for example, to geolocation data, such as country, state, province, region, city, town, zip code, etc. Geolocation data may also involve data received from a location service and/or a navigation service such as the global positioning system (GPS) and similar services (GLONASS, etc.), a cellular location service, location data derived from IOT (internet of things) data, etc. In this regard, spatial proximity, or locality, or geolocation, may form a type, or group of rules for determining association between client devices 13, or between a client device 13 and a user 14.

Figure 5:
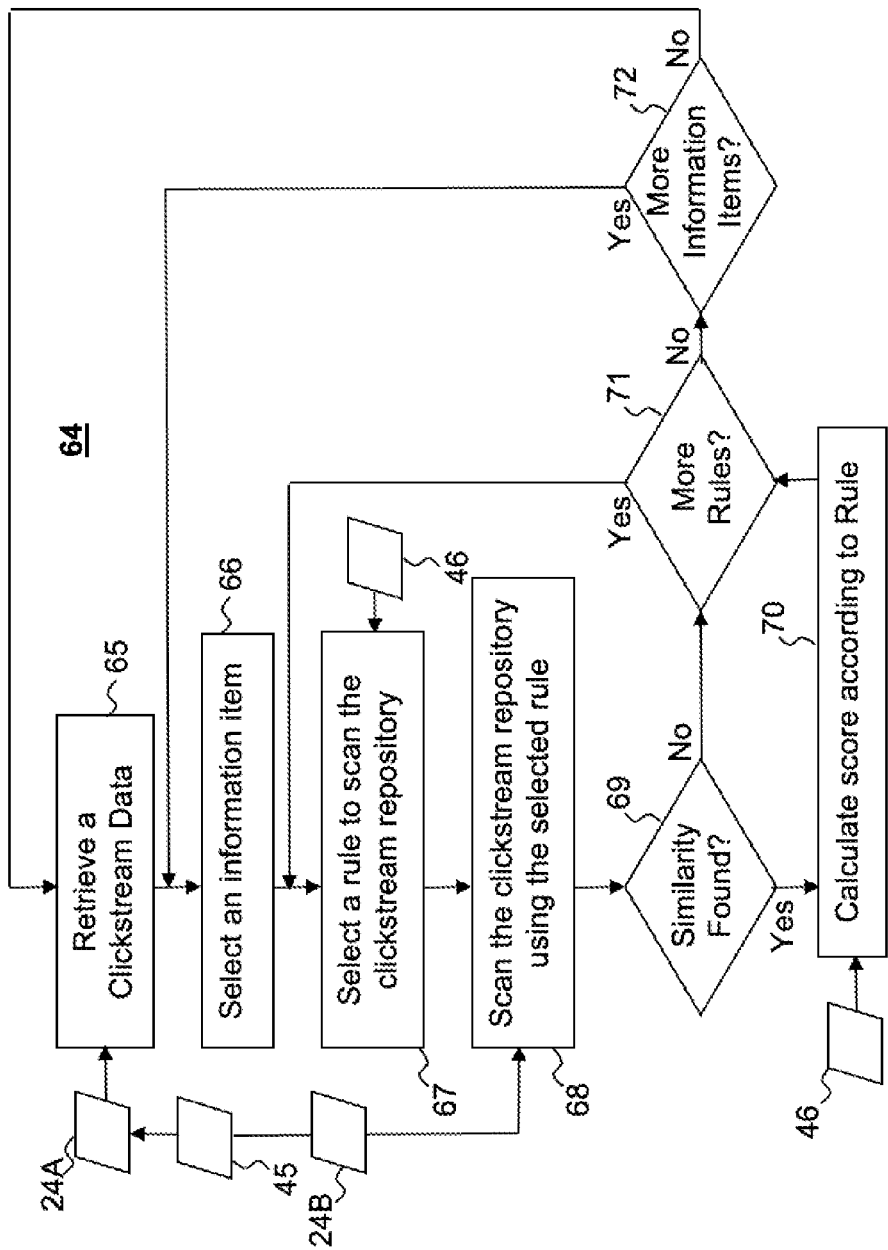
FIG. 5 is a simplified flow chart of a clickstream analysis process.

Reference is now made to FIG. 5, which is a simplified flow chart of a clickstream analysis process 64, according to one embodiment. Clickstream analysis process 64 may correspond to action 57 of FIG. 4, optionally also including actions 58 and/or 60.

As an option, the flow chart of clickstream analysis process 64 of FIG. 5 may be viewed in the context of the details of the previous Figures. Of course, however, the flow chart of FIG. 5 may be viewed in the context of any desired environment. Further, the aforementioned definitions may equally apply to the description below.

As shown in FIG. 5, clickstream analysis process 64 may start with action 65 by receiving a clickstream data item 24, typically retrieved from clickstream repository (or database) 45. The clickstream data item retrieved by action 65 is designated as clickstream data 24A.

Clickstream analysis process 64 may then proceed to action 66 to select an information item contained in clickstream data 24A. As described above with reference to FIG. 4, the first process 49 of association analysis main module 48 has scanned clickstream data 24A and has identified one or more particular information items. Action 66 of clickstream analysis process 64 may now retrieve one of the information items identified by first process 49.

Clickstream analysis process 64 may then proceed to action 67 to select from rules database 46 a rule associated with the type of the information item selected in action 66. Clickstream analysis process 64 may then proceed to action 68 to scan clickstream repository (or database) 45 for another clickstream data 24, designated as clickstream data 24B, that is similar to clickstream data 24A, according to the selected rule.

The selected rule may determine a similarity between clickstream data 24A and clickstream data 24B, for example, if according to the selected rule both clickstream data 24A and clickstream data 24B include information items that the selected rule determine to be sufficiently similar.

In action 69, if the selected rule determines that clickstream data 24A and clickstream data 24B are similar then clickstream analysis process 64 may proceed to action 70 to calculate a respective similarity score, for example according to the selected rule.

In action 71, clickstream analysis process 64 may use any number of rules (of rules database 46) to scan and compare any number of clickstream data items 24B for similarity with the selected information item of clickstream data item 24A. If all rules are used, clickstream analysis process 64 may select other information items of clickstream data item 24A and repeat the search for similarity (action 72). Hence, clickstream data item 24A may generate no new similarity score, or may generate any number of new similarity scores. When all the information items of clickstream data item 24A are processed clickstream analysis process 64 may proceed to process another clickstream data item 24 (action 72).

It is therefore appreciated that the objective of the device association system 10 is to associate different client devices 13 to the same user 14. Such association is preferably determined based on indirect parameters used in the clickstream data, rather than identifiers such as personally identifying information. For this matter, device association system 10 may analyze the cleaned clickstream data 24 to determine proximity of signals to determine that two or more particular devices have sufficient probability to be used by the same person (user 14).

To achieve the objective, a set of matching scores is defined, for example, matching scores Si such as S1, S2, S3 and S4 as defined below. Each matching score may be associated with a type of signal. Each signal may be used to associate between two or more client devices 13, and/or to associate between one or more client devices 13 and a user 14.

For example, location signals (data points) may form a type, or group, of rules for scanning the clickstream data to determine association the devices into proximity groups such as:

Location groups which may include the following groups, or types. Location group L1, which may determine a particular country and scored with S4 matching score. Location group L2, which may determine a particular state and scored with S3 matching score. Location group L3, which may determine a particular city, or town, or a similar entity and scored with S2 matching score. Location group L3, which may determine a particular state (or province, or region of a country, etc.) and scored with S2 matching score. Location group L4, which may determine a particular zip code or a similar parameter, and scored with S1 matching score.

Networking proximity groups, or types, which may include the following groups. Network group N1, which may identify a client device based on the device IP and associate it by applying a matching score S1. Network group N2, which may identify a client device based on Wi-Fi information such as Wi-Fi network name and/or address and associate it by applying a matching score S1.

It is appreciated that groups may be inclusive in the sense that, for example, group L4 is within L3, which is within L2, etc. Group L1 includes largest set of devices, while group N2 includes smallest number of devices. Such inclusion may affect scoring values.

Another type, or group, of rule for identifying, association, and scoring may involve behavioral signals, such as rules identifying any particular behavior of a particular user 14, with respect to one or more client devices 13.

For example, a group, or type, of behavioral signals, which may include, for example, deterministic behavioral signals, which may include, for example, signals detected withing, or related to, a predetermined and/or particular time period associated with clickstream data considered. For example processing monthly period of activity per each client device. It is appreciated that the time period may be predetermined, such as weekly or monthly, or may be determined retroactively, such as a measure of time elapsing between two or more signals.

For example, a group, or type, of behavioral signals related to the scope of data, such as the use of domain names and/or URL paths, visited by the particular client device, for example within a time period.

For example, a group, or type, of behavioral processes. For example, in each respective group, or type, of rules for analyzing a behavioral process the association system 10 may analyze the clickstream for domains that the user has been visiting, and identify unique user parameters in specific URL paths. The device association system 10 may determine that the same URL paths, and/or the same user parameters associated with similar URL paths, are present in two or more client devices. This may associate the two or more client devices with the same user.

For example, device association system 10 may identify a first URL in the clickstream data received from a first client device, the first URL including a string such as ",Ä¶?uid=9584301". The device association system 10 may then identify a second URL in the clickstream data received from a second client device, where the second URL includes the same string ",Ä¶?uid=9584301". Hence device association system 10 may associate between the first client device and the second client device, and set, for example, an S2 matching score.

For example, device association system 10 may analyze specific domains which represent known UUID in their URL paths. For example in a virtual social network such as Facebook the UUID of a user is embedded right after the domain For example, as "https://www.facebook.com/57895343214". This UUID may represent a unique user account in Facebook and may be identified in two or more client devices. When device association system 10 detects the same UUID in two or more client devices device association system 10 may associate the client devices, for example with an S1 matching score.

For example, device association system 10 may analyze the collection of domains on a weekly basis and search for a predetermined threshold proximity match between client devices. If the predetermined threshold proximity is reached device association system 10 may set a matching score such as S2.

Such predetermined threshold proximity may be, for example, 50%, where 50% may represent, for example, that at least 50% of the domains accessed by a first client device during a predetermined period such as the last seven days are also accessed, during the same period, by a second client device. Such predetermined threshold proximity may also require that at least 50% of the domains accessed by the second client device (during the same period) are also accessed by the first client device (during the same period). If such threshold proximity exists, then device association system 10 may apply a related score (such as S2) to each of the first client device and the second client device. It is appreciated that any value different from 50% and 7 days are also possible.

It is appreciated that matching scores (such as S1, S2, S3, and S4) are additive or otherwise calculated to form a total score. It is appreciated that such matching scores and total scores may be calculated independently for any two or more client devices, or any one or more client devices and a respective user. In this regard, a particular client device may be associated with any number of other client devices, or users, maintaining a respective total score with any such particular another client device, or user. Eventually, when a particular total score may reach an association threshold value the particular association may be determined. For example, a particular client device may be associated with a particular user.

Device association system 10 may maintain a scoring board where, for example S4, S3 and S4 may reflect, for example, 5 points, and S1 may reflect, for example, 15 points.

A rule for determining cross-device association, such as determining that a particular user is using two or more particular client devices, may determine such association when a respective total score reaches a predetermined association threshold. For example, the association threshold may be 50, and association system 10 may determine that a particular user is using two or more particular client devices if the respective total score is equal or higher than 50 points.

Therefore, for example, if the Zip Codes of two client devices are the same then the proximity score for the two devices is 30 by adding S1, S2, S3 and S4 (5+5+5+15), as the location rules are inclusive. If, additionally, the IP address or the Wi-Fi address of same two client devices are also the same, then 15 points are added to the total (proximity) score for the two devices, which is now 45 (30+15). If, additionally, the two devices also share the same " . . . ?uid=9584301" then 15 points are added to the total score for the two devices which is now 50 (45+15). If the association threshold value is set to 50 points, then now the two client devices are considered to be operated by the same user.

It is appreciated that any combinations and configurations of rules of any one type or more are also contemplated.

Figure 6:
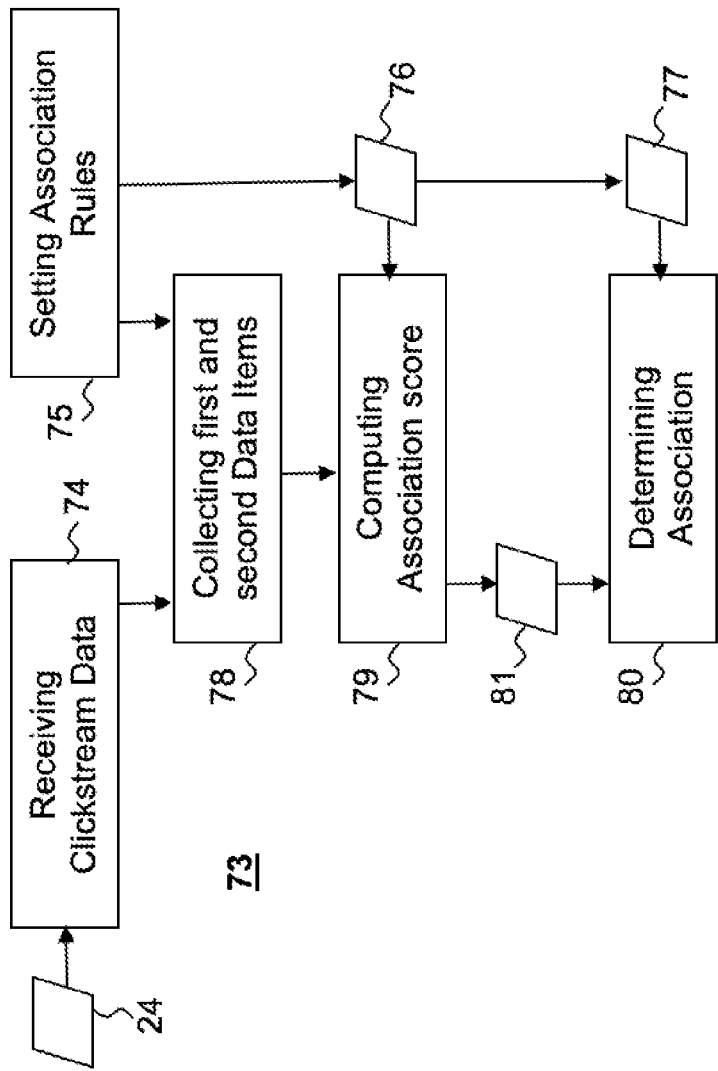
FIG. 6, is a simplified illustration of a method for associating a client device with a user and/or with another client device.

Reference is now made to FIG. 6, which is a simplified illustration of a method 73 for associating a client device with a user and/or with another client device, according to one embodiment.

As an option, the flow chart of process 73 of FIG. 6, may be viewed in the context of the details of any of the previous Figures. Of course, however, the flow chart of FIG. 6 may be viewed in the context of any desired environment. Further, the aforementioned definitions may equally apply to the description below.

Method 73 may start with action 74 by receiving, by a computerized server, from a first computerized client device operated by a first user, a first data content including a plurality of first data items. The first computerized client device may be one of a plurality of computerized client devices operated by a plurality of users. Each computerized client device of the plurality of computerized client devices may be communicatively coupled via a communication network to at least one content server of a plurality of content servers. The data content received by a computerized server from the first computerized client device may include, at least in part, data communicated between any of the devices the plurality of devices and any content server of the plurality of content servers. This data content may be considered clickstream data or cleaned clickstream data 24.

Method 73 may also start with action 75 by setting at least one rule 76 for computing a score representing similarity between at least one data item of the first data items received from the first computerized client device and at least one second data item included in a second data content received from a second computerized client device. Such action of setting one or more rules 76 may be performed by a user such as administrator 26 of FIG. 1. Method 73 may also enable administrator 26 to set association threshold values 77.

Method 73 may proceed to action 78 by collecting the first data content and the second data content, respectively including the plurality of the first data items and the second data items, from a two or more computerized client devices of the plurality of computerized client devices.

Method 73 may proceed to action 79 by computing a score representing the similarity between at least one pair of computerized client devices, respectively providing the first data items and the second data items.

Method 73 may proceed to action 80 by determining that the particular pair of computerized client devices are operated by a same user. Action 80 may determine that two or more computerized client devices are associated, and/or associated with a particular user, if the score reaches a predetermined value, such as association threshold 77.

Action 79 may compute a score of similarity between two (or more) computerized client devices based on one or more rules. Each rule may compare a particular data type, or parameter type typically including at least one particular data type.

Such type of parameters may represent geolocation parameters, such as country, state, city, zip code, GPS data, etc. A rule may therefore determine that a first data item (received from a first computerized client device) and a second data items (received from a second computerized client device) may include the same country, or the same state, or the same city, or the same zip code, or sufficiently close GPS data. Is such case both the first and the second computerized client devices may receive a score associated with the respective shared geolocation parameter.

The score computed by action 79 may be added to, or otherwise calculated to provide, a total score 81 that may represent the probability that the first and the second computerized client devices may be operated by the same user. Action 80 may then compare the total score 81 with the association threshold 77 to determine that the first and the second computerized client devices are operated by the same user.

In a similar manner, action 79 may compute a score of similarity between two (or more) computerized client devices based on same networking parameters (including at least one data type) such as device internet protocol (IP) address, Wi-Fi network name, Wi-Fi network address, and device media access control (MAC) parameters. If, for example, data items received from two different computerized client devices include the same value for any of these networking parameters, then action 79 may compute a score of similarity between these different computerized client devices and add it to the respective total scores of these devices.

In a similar manner, action 79 may compute a score of similarity between two (or more) computerized client devices based on same Hypertext Transfer protocol (HTTP) addressing parameters that may include at least one data type of the same value. For example, data items received from two different computerized client devices include the same value such as the same WWW domain name, the same full URL path, the same UUID in respective URL paths, etc. The score may represent occurrence of a particular value of a particular data type of the group of data types within the first data items collected from said first computerized device and within the second data items collected from the second computerized device.

In a similar manner, action 79 may compute a score of similarity between two (or more) computerized client devices based on temporal proximity. For example, a first occurrence of a particular value of a particular data type of said group of data types within the first data item collected from the first computerized device and a second occurrence of the particular value within a second data item collected from the second computerized device, where the first occurrence and the second occurrence occurring within a predetermined time period.

Optionally, or alternatively, or additionally, the score may represent a ratio between the number of occurrences of a particular value of a particular data type of the group of data types and number of occurrences of all values of the same particular data type within a predetermined time period. In this respect, the ratio may be computed for the first data items collected from the first computerized device and the second data items collected from the second computerized device. For example, if both the ratio computed for the first computerized device and the ratio computed for the second computerized device reach a predetermined ratio threshold value then action 78 may compute a respective score for each of the respective computational client devices.

It is appreciated that the score computed for similarity between any two data items of a particular data type may be different for different data types. It is appreciated that the total score may be computed by combining scores computed for different data types. It is appreciated that a particular pair of computerized devices are operated by a same user may be determined if the total score reaches a predetermined threshold value, and/or if the total score reaches the predetermined value within a predetermined time period.

The probability value that said pair of computerized devices is operated by said same user may be computed based on any two or more combinations of: the total score, the predetermined threshold value, the predetermined time period, the number of the different data types combined in the total score, the ratio between the number of occurrences, the predetermined time period for calculating said ratio, and the predetermined ratio threshold value.

It is expected that during the life of this patent many relevant advertisement systems and applications will be developed and the scope of the terms herein, particularly of the terms "mobile device", "mobile application", "advertisement" or "mobile advertisement", "advertisement bidding", and "bidding agent" or "ad-network", is intended to include all such new technologies a priori.

Additional objects, advantages, and novel features of the embodiments described herein will become apparent to one ordinarily skilled in the art upon examination of the following examples, which are not intended to be limiting. Additionally, each of the various embodiments and aspects of embodiments as delineated hereinabove and as claimed in the claims section below finds experimental support in the following examples.

It is appreciated that certain features of the system and method described herein, which are, for clarity, described in the context of separate embodiments, may also be provided in combination in a single embodiment. Conversely, various features, which are, for brevity, described in the context of a single embodiment, may also be provided separately or in any suitable sub-combination.

Although the system and methods has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A method for associating a device with a user, the method comprising:
   receiving, by a computerized server, from a first computerized device operated by a first user, a first data content comprising a plurality of first data items, wherein said first computerized device is one of a plurality of computerized devices operated by a plurality of users, and wherein each computerized device of said plurality of computerized devices is communicatively coupled via a communication network to at least one content server of a plurality of content servers, and wherein a data content comprises at least part of data communicated between any computerized device of said plurality of computerized devices and any content server of said plurality of content servers;
   setting at least one rule for computing a similarity score, wherein the similarity score represents a similarity between said first data items received from said first computerized device and at least one second data item comprised in a second data content received from a second computerized device;
   collecting said first data content and said second data content respectively comprising said plurality of said first data items and said at least one second data item, from a plurality of computerized devices of said plurality of computerized devices;
   computing said score representing similarity between at least one pair of computerized devices respectively providing said first data items and said at least one second data item; and
   the computerized server associating said pair of computerized devices as being operated by a same user if said score reaches a predetermined value,
   wherein said score represents a first occurrence of a particular value of a particular data type of a group of data types within said first data item collected from said first computerized device and a second occurrence of said particular value within said second data item collected from said second computerized device, wherein said first occurrence and said second occurrence occurring within a predetermined time period; and
   wherein said first data items and said second data items do not represent location of said respective computerized devices, and wherein said first data items and said second data items do not comprise personally identifying information.

2. The method according to claim 1, wherein
   same Hypertext Transfer protocol (HTTP) addressing parameters comprise at least one of: same WWW domain name, same full Universal Resource Locator (URL) path, and same Universally Unique Identifier (UUID) in respective URL paths.

3. The method according to claim 1, further comprising at least one of:
   computing a total score by using a function to combine scores computed for different data types;
   determining that said pair of computerized devices are operated by a same user if said total score reaches a predetermined threshold value; and
   determining that said pair of computerized devices are operated by a same user if said total score reaches a predetermined value within a predetermined time period.

4. The method according to claim 3, further comprising computing a probability value that said pair of computerized devices is operated by said same user, said probability value being based on at least two of: said total score, said predetermined threshold value, said predetermined time period, number of said different data types combined in said total score; a ratio between number of occurrences, said predetermined time period for calculating said ratio, and said predetermined threshold value.

5. A non-transitory computer readable medium storing computer code executable
   by a processor to perform a method for associating a device with a user, the method comprising:
   receiving, by a computerized server, from a first computerized device operated by a first user, a first data content comprising a plurality of first data items, wherein said first computerized device is one of a plurality of computerized devices operated by a plurality of users, and wherein each computerized device of said plurality of computerized devices is communicatively coupled via a communication network to at least one content server of a plurality of content servers, and wherein a data content comprises at least part of data communicated between any computerized device of said plurality of computerized devices and any content server of said plurality of content servers;
   setting at least one rule for computing a similarity score, wherein the similarity score represents a similarity between said first data items received from said first computerized device and at least one second data item comprised in a second data content received from a second computerized device;
   collecting said first data content and said second data content respectively comprising said plurality of said first data items and said at least one second data item, from a plurality of computerized devices of said plurality of computerized devices;
   computing said score representing similarity between at least one pair of computerized devices respectively providing said first data items and said at least one second data item; and
   the computerized server associating said pair of computerized devices as being operated by a same user if said score reaches a predetermined value,
   wherein said score represents a first occurrence of a particular value of a particular data type of a group of data types within said first data item collected from said first computerized device and a second occurrence of said particular value within said second data item collected from said second computerized device, wherein said first occurrence and said second occurrence occurring within a predetermined time period; and wherein said first data items and said second data items do not represent location of said respective computerized devices, and wherein said first data items and said second data items do not comprise personally identifying information.

6. The non-transitory computer readable medium storing computer code executable by a processor according to claim 5, wherein same Hypertext Transfer protocol (HTTP) addressing parameters comprise at least one of: same WWW domain name, same full Universal Resource Locator (URL) path, and same Universally Unique Identifier (UUID) in respective URL paths.

7. The non-transitory computer readable medium storing computer code executable by a processor according to claim 5, further comprising at least one of:

computing a total score by using a function to combine scores computed for different data types;

determining that said pair of computerized devices are operated by a same user if said total score reaches a predetermined threshold value; and determining that said pair of computerized devices are operated by a same user if said total score reaches a predetermined value within a predetermined time period.

8. The non-transitory computer readable medium storing computer code executable by a processor according to claim 7, further comprising computing a probability value that said pair of computerized devices is operated by said same user, said probability value being based on at least two of: said total score, said predetermined threshold value, said predetermined time period, number of said different data types combined in said total score; a ratio between number of occurrences, said predetermined time period for calculating said ratio, and a predetermined threshold value.

* * * * *